United States Patent
Hotta et al.

(10) Patent No.: US 11,619,566 B2
(45) Date of Patent: Apr. 4, 2023

(54) STRADDLED VEHICLE ENGINE UNIT AND STRADDLED VEHICLE

(71) Applicants: YAMAHA HATSUDOKI KABUSHIKI KAISHA, Iwata (JP); DENSO CORPORATION, Kariya (JP)

(72) Inventors: Minoru Hotta, Aichi (JP); Yoshihiko Nonogaki, Aichi (JP); Kazuteru Iwamoto, Shizuoka (JP); Hisatoshi Kinoshita, Shizuoka (JP); Nobuyuki Kawashima, Shizuoka (JP)

(73) Assignees: YAMAHA HATSUDOKI KABUSHIKI KAISHA, Iwata (JP); DENSO CORPORATION, Kariya (JP)

( * ) Notice: Subject to any disclaimer, the term of this patent is extended or adjusted under 35 U.S.C. 154(b) by 29 days.

(21) Appl. No.: 17/473,865

(22) Filed: Sep. 13, 2021

(65) Prior Publication Data
US 2021/0404913 A1 Dec. 30, 2021

Related U.S. Application Data

(63) Continuation-in-part of application No. PCT/JP2020/006042, filed on Feb. 17, 2020.

(30) Foreign Application Priority Data

Mar. 13, 2019 (JP) .............................. JP2019-045538

(51) Int. Cl.
*B62M 7/02* (2006.01)
*F02D 41/14* (2006.01)
*G01M 15/11* (2006.01)

(52) U.S. Cl.
CPC .............. *G01M 15/11* (2013.01); *B62M 7/02* (2013.01); *F02D 41/1498* (2013.01); *F02D 2200/101* (2013.01); *F02D 2200/1015* (2013.01)

(58) Field of Classification Search
CPC .............. G01M 15/11; F02D 2200/101; F02D 2200/1015; F02D 2200/702
See application file for complete search history.

(56) References Cited

U.S. PATENT DOCUMENTS 5,278,760 A    1/1994   Ribbens et al.
5,381,688 A * 1/1995   Ikeda ....................... G01B 5/28
                                                                        73/105

(Continued)

FOREIGN PATENT DOCUMENTS

EP         1978228 A1    10/2008
JP     H06207551 A     7/1994
(Continued)

*Primary Examiner* — George C Jin
(74) *Attorney, Agent, or Firm* — Rabin & Berdo, P.C.

(57) ABSTRACT

A straddled vehicle engine unit including an internal combustion engine and a misfire detection device. The misfire detection device includes a crankshaft rotation speed fluctuation physical quantity acquisition unit and a misfire determination unit. The misfire determination unit includes first to third determination units. The first determination unit determines whether or not the crankshaft rotation speed fluctuation physical quantity acquired by the crankshaft rotation speed fluctuation physical quantity acquisition unit is greater than a set physical quantity determination reference. The second determination unit determines whether or not a fluctuation pattern constituted by a physical quantity and the crankshaft rotation speed fluctuation physical quantity acquired at least before or after the physical quantity falls within a set misfire pattern range. The third determination unit determines whether a misfire determination is to be set as effective or not, based on results of determination by the first and second determination units.

6 Claims, 9 Drawing Sheets

(56) References Cited

U.S. PATENT DOCUMENTS

| | | | | |
|---|---|---|---|---|
| 5,499,537 | A | * | 3/1996 | Nakayama ............. G01M 15/11 701/111 |
| 5,625,143 | A | * | 4/1997 | Kadota ................. G01M 15/11 324/392 |
| 8,027,782 | B2 | | 9/2011 | Assaf et al. |
| 2011/0066358 | A1 | * | 3/2011 | Assaf ................. F02D 41/1498 73/114.02 |
| 2016/0299035 | A1 | * | 10/2016 | Choi ...................... G01M 15/11 |
| 2018/0087462 | A1 | * | 3/2018 | Hotta ................. F02D 41/1497 |

FOREIGN PATENT DOCUMENTS

| | | |
|---|---|---|
| JP | H08144838 A | 6/1996 |
| JP | 2006152971 A | 6/2006 |
| JP | 2009293501 A | 12/2009 |
| JP | 2016070255 A | 5/2016 |

\* cited by examiner (a)

(b)

(c) ROUGH ROAD TRAVELING STATE   (d) MISFIRE SITUATION

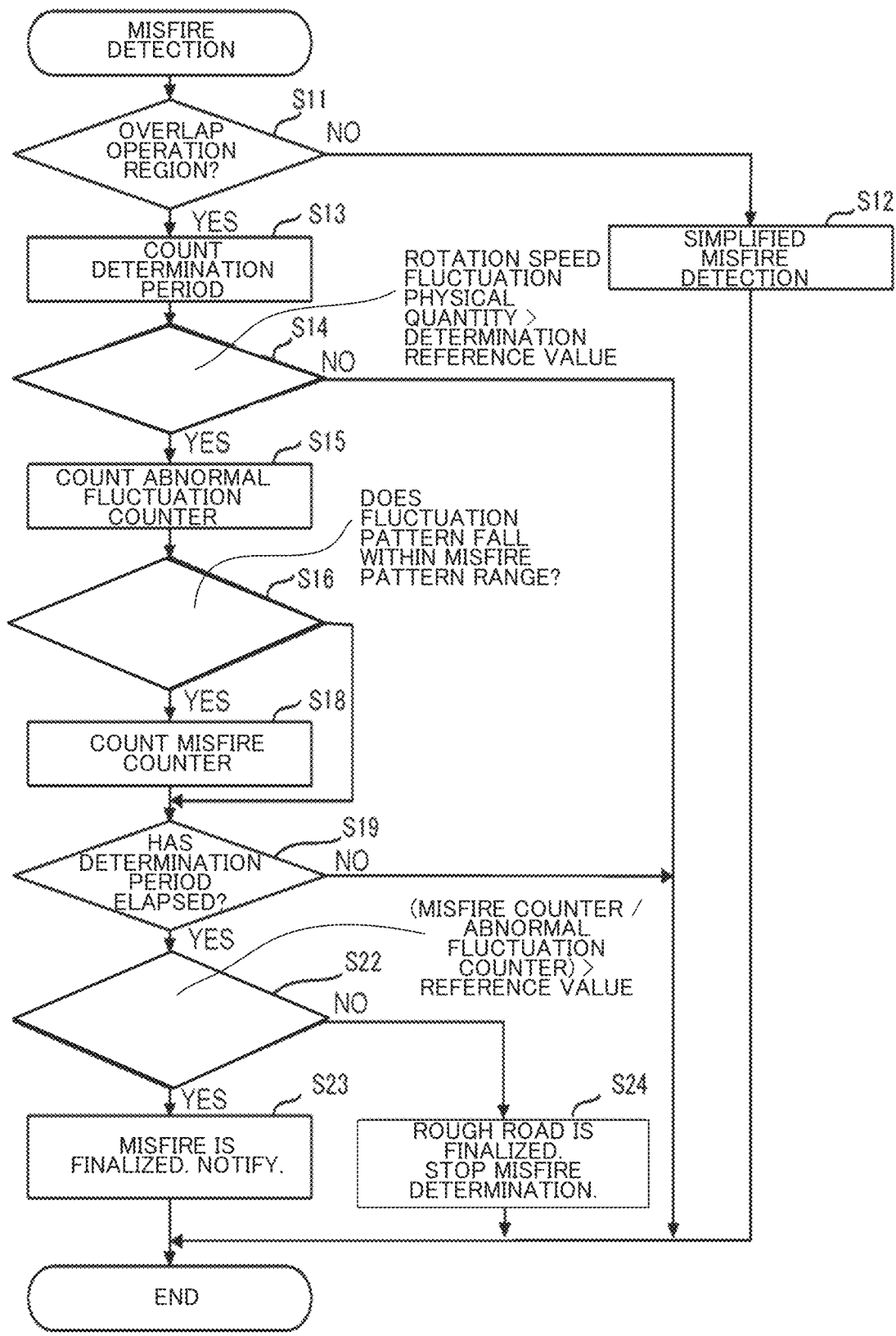

STRADDLED VEHICLE ENGINE UNIT AND STRADDLED VEHICLE

CROSS-REFERENCE TO RELATED APPLICATIONS

This is a continuation-in-part application of International Application PCT/JP2020/006042 filed on Feb. 17, 2020, which claims priority from a Japanese Patent Application No. 2019-045538, filed on Mar. 13, 2019. The contents of the applications are incorporated herein by reference.

TECHNICAL FIELD

The present teaching relates to a straddled vehicle engine unit and a straddled vehicle.

BACKGROUND ART

A straddled vehicle engine unit, which includes an internal combustion engine and various devices, is mounted to a straddled vehicle. For example, Patent Literature 1 (PTL 1) shows a misfire determination device for determining a misfire in an engine that is mounted to a motorcycle. The engine as a determination object of the misfire determination device includes two or more cylinders.

The misfire determination device according to PTL 1 is capable of determining the presence or absence of a misfire in the engine including two or more cylinders, by detecting a change in a physical quantity indicative of the rotation speed of a crankshaft.

CITATION LIST

Patent Literature

PTL 1: Japanese Patent Application Laid-Open No. 2016-70255

SUMMARY OF INVENTION

Technical Problem

In an internal combustion engine of a straddled vehicle engine unit mounted to a straddled vehicle, the internal combustion engine including two or more cylinders, distinguishing a misfire with high accuracy may sometimes be impossible depending on an operating state of the internal combustion engine.

The present teaching aims to provide a straddled vehicle engine unit including two or more cylinders and mounted to a straddled vehicle, the straddled vehicle engine unit capable of detecting a misfire in an internal combustion engine with high accuracy over a wide operation range of the internal combustion engine.

Solution to Problem

The inventors of the present application conducted studies, aiming to detect a misfire in an internal combustion engine with high accuracy over a wide operation range, the internal combustion engine including two or more cylinders and being mounted to a straddled vehicle. The inventors consequently found out the following.

It is desired that an internal combustion engine including two or more cylinders and mounted to a straddled vehicle be capable of operating at a higher rotation speed than an internal combustion engine mounted to a four-wheeled vehicle, for example. This is why an internal combustion engine of a straddled vehicle engine unit is normally configured to have a lower moment of inertia than an internal combustion engine mounted to a four-wheeled vehicle, for example. With such a configuration, the rotation speed in a low rotation speed region, for example, easily changes even in a normal situation. Moreover, in a low load region for example, a force that drives a crankshaft is weak, and therefore the rotation speed in the normal situation changes more easily. Of internal combustion engines mounted to straddled vehicles, an internal combustion engine including two or more cylinders has a smaller rotation speed fluctuation amount in the misfire situation as compared to a fluctuation amount in a single-cylinder internal combustion engine, for example.

Thus, in a case of the internal combustion engine having a lower moment of inertia, a crankshaft rotation speed fluctuation amount distribution in the normal situation tends to widen in a low load and low rotation speed region. It therefore is likely that the crankshaft rotation speed fluctuation amount distribution in the normal situation and a crankshaft rotation speed fluctuation amount distribution in the misfire situation overlap each other in their adjacent tails. This makes it difficult to determine a difference from a rotation speed change in the misfire situation.

An exhaust valve and an intake valve of the internal combustion engine including two or more cylinders and mounted to the straddled vehicle are opened for a longer period than those of an internal combustion engine mounted to a four-wheeled vehicle for example, because of the need to be capable of operating at a higher rotation speed than the internal combustion engine mounted to the four-wheeled vehicle for example. Thus, a period of valve overlap, in which the exhaust valve and the intake valve are opened simultaneously, is long. This makes it likely that an exhaust gas in an exhaust passage is brought, as if returning, into a combustion chamber due to a negative pressure of intake air. Consequently, mixing of internal residual gases is likely to occur. Especially in the low load and low rotation speed region, the degree of opening of a throttle valve is low, so that the negative pressure (absolute value) of intake air bringing the exhaust gas into the combustion chamber is high. The larger the amount of exhaust gas contained in the combustion chamber is, the lower the gas combustion speed in the combustion chamber is. This is why the internal combustion engine mounted to the straddled vehicle has a prolonged combustion period in the low load and low rotation speed region. As the combustion period is long, a variation of the combustion period is large accordingly. Thus, the rotation speed in the low load and low rotation speed region, for example, easily changes even in the normal situation.

In the internal combustion engine of the straddled vehicle engine unit, the crankshaft rotation speed fluctuation amount distribution in the normal situation is likely to widen in the low load and low rotation speed region. As a result, the crankshaft rotation speed fluctuation amount distribution in the normal situation and the crankshaft rotation speed fluctuation amount distribution in the misfire situation are likely to overlap each other in their adjacent tails.

As described above, a region where the crankshaft rotation speed fluctuation physical quantity distribution in the normal situation and the crankshaft rotation speed fluctuation physical quantity distribution in the misfire situation partially overlap each other tends to be present in an operating region of the internal combustion engine of the straddled vehicle engine unit including two or more cylinders and mounted to the straddled vehicle. Overlap of the adjacent tails of the distribution in the normal situation and the distribution in the misfire situation makes it difficult to determine a rotation speed change in the misfire situation.

Moreover, when a vehicle equipped with such an internal combustion engine travels on rough road, the crankshaft rotation speed is likely to be unstable due to unevenness of the road surface. This is because a state of ground contact between wheels and the road surface cannot be constant but the vehicle is sometimes away from the road surface and sometimes strongly making contact with the ground so that a load applied to the internal combustion engine fluctuates. Consequently, even though no misfire is occurring, the crankshaft rotation speed fluctuation amount distribution is likely to further widen. The crankshaft rotation speed fluctuation amount distribution in the normal situation traveling on rough road and the crankshaft rotation speed fluctuation amount distribution in the misfire situation are likely to overlap. It is difficult to distinguish whether data on the overlap region is data in the normal situation traveling on rough road or data in the misfire situation. The accuracy of misfire detection in the low rotation speed region is reduced, therefore.

The inventors of the present application conducted studies, aiming to find a method for picking up a fluctuation in a normal situation from between a fluctuation amount in a normal situation traveling on rough road and a fluctuation amount in a misfire situation, even when there is an overlap between a crankshaft rotation speed fluctuation amount distribution in the normal situation traveling on rough road and a crankshaft rotation speed fluctuation amount distribution in the misfire situation.

In the studies, the inventors of the present application found that a method different from a detection in the normal situation can be applied to a case where the crankshaft rotation speed fluctuation amount distribution in the normal situation widens so that the crankshaft rotation speed fluctuation amount distribution in the normal situation overlaps the crankshaft rotation speed fluctuation amount distribution in the misfire situation.

In the method, firstly, a fluctuation pattern of the crankshaft rotation speed that is acquired sequentially is determined in relation to a fluctuation in a region where the fluctuation amount distributions overlap each other. Unlike a fluctuation caused by traveling on rough road, which occurs at random for example, a misfire is a phenomenon unique to a specific cycle, that is, a combustion cycle, of the internal combustion engine. In addition, the amount of fluctuation caused by a misfire depends on combustion characteristics of the internal combustion engine. Accordingly, a determination of whether a fluctuation of the crankshaft rotation speed is attributable to a misfire can be performed with higher accuracy than a determination of whether a fluctuation is attributable to traveling on rough road for example.

The inventors of the present application discovered that while the crankshaft rotation speed fluctuation amount distribution in the normal situation may possibly widen due to operating conditions or traveling on rough road, the accuracy of misfire detection can be improved by determining whether or not a fluctuation is attributable to a misfire instead of determining whether or not a fluctuation is attributable to the operating conditions or traveling on rough road. The discovery is widely applicable not only to the crankshaft rotation speed fluctuation amount but also any method using a physical quantity related to the crankshaft rotation speed fluctuation amount.

To attain the aim, an aspect of the present teaching provides a drive system abnormality determination device for a straddled vehicle, the device having the following configurations.

(1) A straddled vehicle engine unit provided to a straddled vehicle includes:

an internal combustion engine including two or more cylinders, a crankshaft, and a crank angle signal output unit that periodically outputs a crank angle signal in accordance with rotation of the crankshaft; and a misfire detection device including a crankshaft rotation speed fluctuation physical quantity acquisition unit and a misfire determination unit, the crankshaft rotation speed fluctuation physical quantity acquisition unit being configured to acquire a physical quantity related to the amount of fluctuation in the rotation speed of the crankshaft as a crankshaft rotation speed fluctuation physical quantity, based on a signal from the crank angle signal output unit, the misfire determination unit being configured to determine a misfire state of the internal combustion engine based on the crankshaft rotation speed fluctuation physical quantity acquired by the crankshaft rotation speed fluctuation physical quantity acquisition unit, the internal combustion engine being configured such that while the internal combustion engine is in operation, a crankshaft rotation speed and a load are located in a region including an overlap operation region, the overlap operation region being a region where a part of a crankshaft rotation speed fluctuation physical quantity distribution in a normal situation and a part of a crankshaft rotation speed fluctuation physical quantity distribution in a misfire situation overlap each other, the misfire determination unit including a first determination unit that determines whether or not the crankshaft rotation speed fluctuation physical quantity acquired by the crankshaft rotation speed fluctuation physical quantity acquisition unit is greater than a physical quantity determination reference in a case where a crankshaft rotation speed and a load of the internal combustion engine that is in operation are located in at least the overlap operation region, the physical quantity determination reference being set between two crankshaft rotation speed fluctuation physical quantities, wherein one corresponds to a peak of the crankshaft rotation speed fluctuation physical quantity distribution in the normal situation and the other corresponds to a peak of the crankshaft rotation speed fluctuation physical quantity distribution in the misfire situation, a second determination unit that determines, regarding at least part of crankshaft rotation speed fluctuation physical quantities acquired by the crankshaft rotation speed fluctuation physical quantity acquisition unit, whether or not a fluctuation pattern falls within a set misfire pattern range, the fluctuation pattern being constituted by the at least part of the physical quantities and the crankshaft rotation speed fluctuation physical quantity acquired at least before or after the at least part of the physical quantities, and a third determination unit that determines whether a misfire determination is set to be effective or not, based on a result of the determination by the first determination unit and a result of the determination by the second determination unit.

In the above-described configuration, the straddled vehicle engine unit is provided to the straddled vehicle. The straddled vehicle engine unit includes the internal combustion engine, the crankshaft rotation speed fluctuation physical quantity acquisition unit, and the misfire detection device. The internal combustion engine includes two or more cylinders. The crankshaft rotation speed fluctuation physical quantity acquisition unit acquires a physical quantity related to the amount of fluctuation in the rotation speed of the crankshaft. The internal combustion engine having the above-described configuration is an internal combustion engine provided to the straddled vehicle. The internal combustion engine is configured so as to operate in a region including the overlap operation region where a part of the crankshaft rotation speed fluctuation physical quantity distribution in the normal situation and a part of the crankshaft rotation speed fluctuation physical quantity distribution in the misfire situation overlap each other.

The misfire detection device determines a misfire state of the internal combustion engine including the two or more cylinders, based on the crankshaft rotation speed fluctuation physical quantity. The misfire detection device includes the first determination unit, the second determination unit, and the third determination unit.

The first determination unit determines whether or not an acquired crankshaft rotation speed fluctuation physical quantity is greater than the physical quantity determination reference in a case where an operation is in at least the overlap operation region. The physical quantity determination reference is set between the crankshaft rotation speed fluctuation physical quantity corresponding to the peak of the crankshaft rotation speed fluctuation physical quantity distribution in the normal situation and the crankshaft rotation speed fluctuation physical quantity corresponding to the peak of the crankshaft rotation speed fluctuation physical quantity distribution in the misfire situation. With this, the first determination unit is able to determine a misfire with a certain accuracy by using the magnitude of the crankshaft rotation speed fluctuation physical quantity. In an internal combustion engine including two or more cylinders, however, there is a possibility that part of crankshaft rotation speed fluctuation physical quantities in the normal situation may be mixed in crankshaft rotation speed fluctuation physical quantities that are therefore determined as being greater than the physical quantity determination reference. When the straddled vehicle is in a rough road traveling state, an increased number of rotation speed fluctuation physical quantities may be determined as being greater than the physical quantity determination reference even though not being in the misfire situation.

The second determination unit makes a determination on at least part of crankshaft rotation speed fluctuation physical quantities acquired by the crankshaft rotation speed fluctuation physical quantity acquisition unit. The second determination unit determines whether or not a fluctuation pattern constituted by the at least part of the physical quantities and the crankshaft rotation speed fluctuation physical quantity acquired at least before or after the at least part of the physical quantities falls within the set misfire pattern range.

The third determination unit determines whether a misfire determination is to be set as effective or not, based on a result of the determination by the first determination unit and a result of the determination by the second determination unit.

Even not in the misfire state, there is a possibility that the crankshaft rotation speed fluctuation physical quantity distribution in the normal situation may widen due to operating conditions or traveling on rough road. This may sometimes increase the number of times that the crankshaft rotation speed fluctuation physical quantities are determined as being greater than the physical quantity determination reference by the first determination unit. In such a case, the crankshaft rotation speed fluctuation physical quantities that are determined as being greater than the physical quantity determination reference by the first determination unit contain a crankshaft rotation speed fluctuation physical quantity that is actually not attributable to a misfire.

In the above-described configuration, the second determination unit performs a determination using a reference different from the reference used in the determination performed by the first determination unit. For example, if a result of the determination by the second determination unit largely differs from a result of the determination by the first determination unit, the result of the determination by the first determination unit probably indicates a situation where a misfire can essentially not be determined. Based on the result of the determination by the first determination unit and the result of the determination by the second determination unit, the third determination unit determines whether a misfire determination is to be set as effective or not. Accordingly, a misfire in an internal combustion engine including two or more cylinders can be detected with high accuracy.

In an aspect of the present teaching, the straddled vehicle engine unit can adopt the following configuration.

(2) The straddled vehicle engine unit according to (1) is configured such that a crankshaft rotation speed fluctuation physical quantity that is determined as being greater than the physical quantity determination reference by the first determination unit serves as the at least part of the physical quantities, used by the second determination unit in determining whether or not a fluctuation pattern is included in a set misfire pattern range, the fluctuation pattern being constituted by the at least part of the physical quantities and the crankshaft rotation speed fluctuation physical quantity acquired at least before or after the at least part of the physical quantities.

In the above-described configuration, by using the result of the determination by the first determination unit, a crankshaft rotation speed fluctuation physical quantity attributable to a misfire is selected with a higher accuracy. That is, the determination by the second determination unit is for determining the accuracy of the determination by the first determination unit. If the accuracy of the determination by the first determination unit is low, it probably indicates a situation where a misfire can essentially not be determined. Based on the accuracy of the determination by the first determination unit, the third determination unit determines whether a misfire determination is to be set as effective or not. Accordingly, a misfire can be detected with higher accuracy.

In an aspect of the present teaching, the straddled vehicle engine unit can adopt the following configuration.

(3) The straddled vehicle engine unit according to (2) is configured such that the third determination unit determines whether a misfire determination is to be set as effective or not, based on one frequency relative to another frequency, the one frequency being a frequency of crankshaft rotation speed fluctuation physical quantities that are determined as being within the misfire pattern range by the second determination unit, the another frequency being a frequency of crankshaft rotation speed fluctuation physical quantities that are determined as being greater than the physical quantity determination reference by the first determination unit.

In the above-described configuration, the frequency related to the first determination unit and the frequency related to the second determination unit are used to determine the accuracy of the determination by the first determination unit. For example, if the frequency of physical quantities that the second determination unit determines as not falling within the set misfire pattern range is low relative to the frequency of physical quantities that the first determination unit determines as being greater than the physical quantity determination reference, it probably indicates a situation where a misfire can essentially not be determined. The above-described configuration can suppress occurrence of an erroneous determination of a misfire under a state where a misfire determination based on a crankshaft rotation speed fluctuation physical quantity is difficult, such as a state where the straddled vehicle is traveling on rough road.

Accordingly, a misfire in the internal combustion engine including the two or more cylinders and mounted to the straddled vehicle can be detected with high accuracy over a wide operation range of the internal combustion engine.

In an aspect of the present teaching, the straddled vehicle engine unit can adopt the following configuration.

(4) The straddled vehicle engine unit according to (1) is configured such that
the third determination unit determines whether a misfire determination is to be set as effective or not, based on a result of the determination by the first determination unit and a result of the determination by the second determination unit, in a case where the internal combustion engine is operating in a low load and low rotation speed region, the low load and low rotation speed region being the overlap operation region, the low load and low rotation speed region corresponding to both a low rotation speed region and a low load region, the low rotation speed region being the lowest region including the lowest crankshaft rotation speed among three regions obtained by trisecting a range of crankshaft rotation speeds that can be outputted by the internal combustion engine, the low load region being the lowest region including the lowest load among three regions obtained by trisecting a range of loads that can be outputted by the internal combustion engine.

In the internal combustion engine of the straddled vehicle engine unit, the crankshaft rotation speed fluctuation physical quantity distribution in the normal situation and the crankshaft rotation speed fluctuation physical quantity distribution in the misfire situation are likely to overlap each other in their adjacent tails in the low load and low rotation speed region. In the above-described configuration, the determination by the third determination unit, which is based on a result of the determination by the second determination unit, is performed at least in the low load and low rotation speed region. Accordingly, a misfire can be detected with high accuracy over a region including the region where adjacent tails of the crankshaft rotation speed fluctuation physical quantity distributions are likely to overlap.

In an aspect of the present teaching, the straddled vehicle engine unit can adopt the following configuration.

(5) The straddled vehicle engine unit according to (1) is configured such that
the internal combustion engine is configured to operate in a region including a separate operation region where the crankshaft rotation speed fluctuation physical quantity distribution in the normal situation and the crankshaft rotation speed fluctuation physical quantity distribution in the misfire situation are separated from each other by an interval, and
the physical quantity determination reference is set within a range of the interval.

The above-described configuration can suppress the frequency at which the first determination unit determines an acquired crankshaft rotation speed fluctuation physical quantity as being greater than the physical quantity determination reference, even while the internal combustion engine is operating in the overlap operation region. As a result, a crankshaft rotation speed fluctuation physical quantity that is obviously not attributable to a misfire can be excluded from determination objects of the second determination unit. Accordingly, the accuracy of the determinations by the second determination unit and the third determination unit can be improved.

In an aspect of the present teaching, a straddled vehicle can adopt the following configuration.

(6) A straddled vehicle includes:
the straddled vehicle engine unit according to (1); and
a driving wheel that is driven by the straddled vehicle engine unit.

With the above-described configuration, a misfire in the internal combustion engine mounted to the straddled vehicle can be detected with high accuracy over a wide operation range.

The terminology used herein is for defining particular embodiments only and is not intended to be limiting the teaching.

As used herein, the term "and/or" includes any and all combinations of one or more of the associated listed items.

As used herein, the terms "including", "comprising", or "having", and variations thereof specify the presence of stated features, steps, elements, components, and/or equivalents thereof, and can include one or more of steps, operations, elements, components, and/or their groups.

As used herein, the terms "attached", "connected", "coupled", and/or equivalents thereof are used in a broad sense, and include both of direct and indirect attachment and coupling unless otherwise specified. The terms "connected" and "coupled" are not limited to physical or mechanical connection or coupling, and can include direct and indirect electrical connection and coupling.

Unless otherwise defined, all terms (including technical and scientific terms) used herein have the same meaning as commonly understood by one of ordinary skill in the art to which the present teaching belongs.

It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein.

It will be understood that the description of the present teaching discloses multiple techniques and steps.

Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion.

Nevertheless, Description and Claims should be read with the understanding that such combinations are entirely within the scope of the present teaching and the claims.

Description will give an explanation about a novel straddled vehicle engine unit.

In the description given below, for the purposes of explanation, numerous specific details are set forth in order to provide a thorough understanding of the present teaching.

It will be apparent, however, that those skilled in the art may practice the present teaching without these specific details.

The present disclosure is to be considered as an exemplification of the present teaching, and is not intended to limit the present teaching to the specific embodiments illustrated by drawings or descriptions below.

The straddled vehicle engine unit includes the internal combustion engine and the misfire detection device, and is provided in the straddled vehicle. The misfire detection device may be either an ECU which will be described later, or a control device that is provided in the vehicle separately from the ECU, for example. The misfire detection device is capable of communicating with at least the internal combustion engine, for example. The misfire detection device is configured to be capable of receiving a signal outputted from a sensor, etc. included in the internal combustion engine and transmitting a control signal to various apparatuses and/or devices, etc.

included in the internal combustion engine, for example. The misfire detection device may further be configured to be capable of receiving a signal outputted from a sensor, etc. included in the vehicle and transmitting a control signal to various apparatuses and/or devices, etc. included in the vehicle, for example. The straddled vehicle engine unit does not always represent physical unification of the internal combustion engine and the misfire detection device. In the straddled vehicle engine unit, the internal combustion engine and the misfire detection device may be configured as a physically integrated unit, or may not be configured as a physically integrated unit.

The straddled vehicle includes, for example, a wheel in addition to the straddled vehicle engine unit. The wheel includes a driving wheel that is rotated by receiving power outputted from the internal combustion engine. The number of wheels is not particularly limited. The straddled vehicle refers to a vehicle of a type having a saddle where a rider sits astride. Examples of the straddled vehicle include a motorcycle, a three-wheeled motorcycle, and an all-terrain vehicle (ATV).

The driving wheel of the straddled vehicle is a rear wheel, for example. The driving wheel is not limited to this, and may be a front wheel, for example.

Examples of the internal combustion engine include, but are not particularly limited to, a four-stroke engine. The internal combustion engine may be either a gasoline engine or a diesel engine. The number of cylinders is not particularly limited. Examples of the internal combustion engine include internal combustion engines including various numbers of cylinders, namely, four cylinders, six cylinders, eight cylinders, and the like. The internal combustion engine may be an internal combustion engine including a single-cylinder, two cylinders, or three cylinders. A multi-cylinder internal combustion engine may be either of equal interval combustion type or of unequal interval combustion type.

A load corresponding to the low load and low rotation speed region is, specifically, not particularly limited. The load varies depending on specifications of the vehicle and/or the internal combustion engine, and also varies depending how the load is detected. A specific numerical value of the load is not particularly limited. A high load corresponds to a load generated when, for example, the vehicle accelerates, travels uphill, or travels at a high speed so as to maintain high speed rotation of the internal combustion engine. A low load corresponds to a load generated when, for example, the vehicle is in steady operation, decelerates, or travels downhill. The high load, the middle load, and the low load can be relatively identified by the relationship thereamong. The internal combustion engine may include a load detector for detecting a load of the internal combustion engine, for example. The load detector is not particularly limited, and a conventionally known detector such as an intake pipe pressure sensor or an in-cylinder pressure sensor can be adopted. The misfire detection device may include a load-related information acquisition unit that acquires information about a load of the internal combustion engine based on a signal from the load detector, for example. The misfire detection device may stop determining a misfire in the internal combustion engine, not relying on a signal from the load detector or information acquired by the load-related information acquisition unit, but based on a result of a determination by a rough road traveling determination unit.

The crank angle signal output unit is not particularly limited, and a conventionally known apparatus can be adopted as the crank angle signal output unit. Examples of the crank angle signal output unit include a resolver, a Hall IC, an electromagnetic induction type sensor, and the like. For example, the crank angle signal output unit outputs a crank angle signal indicating passing of any of detection object portions that are disposed on the crankshaft and arranged at intervals corresponding to a predetermined detection angle. The crank angle signal output unit periodically outputs a crank angle signal in relation to rotation of the crankshaft. It however is not always necessary that the crank angle signal output unit is configured to output a crank angle signal on a constant cycle all the time while the crankshaft is rotating at a constant speed, for example. Apart of the detection object portions may be arranged at an interval different from the intervals at which the rest of the detection object portions are arranged, for example. Consequently, in a partial crankshaft rotation angle region, the crank angle signal output unit may output a signal on a different cycle as compared to the other regions, for example.

A hardware configuration of the misfire detection device is not particularly limited. The misfire detection device may be constituted of a computer including a central processing unit and a storage device. The misfire detection device may be partially or entirely constituted of a wired logic, which is an electronic circuit. The misfire detection device as a whole may be physically configured as a single piece, or may be physically configured as a combination of different devices.

The crankshaft rotation speed fluctuation physical quantity is a physical quantity related to the amount of fluctuation in the rotation speed of the crankshaft. The crankshaft rotation speed fluctuation physical quantity is a value in which a fluctuation in the rotation speed of the crankshaft is reflected. This value differs between the normal situation and the misfire situation. The rotation speed of the crankshaft may be an instantaneous rotation speed acquired based on one of time intervals of crank angle signals that are periodically and sequentially outputted from the crank angle signal output unit, or may be an average rotation speed (moving average rotation speed) over a section of a predetermined crank angle (such as 180CAD or 360CAD). The crankshaft rotation speed fluctuation physical quantity may be, for example, a differential value between a rotation speed (instantaneous rotation speed or average rotation speed) corresponding to a first crank angle section and a rotation speed (instantaneous rotation speed or average rotation speed) corresponding to a second crank angle section. In this configuration, the first crank angle section is, for example, set so as to at least partially overlap a section from a compression top dead center of a cylinder that is a misfire detection object to a compression top dead center that comes next in the internal combustion engine. The second crank angle section is, for example, set before the compression top dead center. If a misfire occurs at the compression top dead center, a rotation speed of the crankshaft corresponding to the first crank angle section decreases, but a rotation speed of the crankshaft corresponding to the second crank angle section is not affected by the misfire. Acquisition of the differential value makes it possible to obtain a crankshaft rotation speed fluctuation physical quantity that reflects a difference between the normal situation and the misfire situation. It is not always necessary that a rotation speed corresponding to each section is used without any change to acquire a differential value. It may be acceptable that each rotation speed corresponding to each section is subjected to a computation or correction process, and based on each rotation speed obtained as a result of the process, a differential value is acquired. The crankshaft rotation speed fluctuation physical quantity may be a crankshaft rotation speed fluctuation physical quantity for an equal interval explosion engine, or may be a crankshaft rotation speed fluctuation physical quantity for an unequal interval explosion engine. The crankshaft rotation speed fluctuation physical quantity may be, for example, a rotation speed of a rotator (such as a gear, a shaft, or the like) in a power transfer path extending from the crankshaft to the wheel.

The second determination unit, for example, determines a fluctuation pattern constituted by a physical quantity acquired at a certain timing and a physical quantity acquired after the certain timing. The second determination unit is not limited to this, and for example, may determine a fluctuation pattern constituted by a physical quantity acquired at a certain timing and a physical quantity acquired before the certain timing. Alternatively, for example, the second determination unit may determine a fluctuation pattern constituted by a physical quantity acquired at a certain timing, a physical quantity acquired before the certain timing, and a physical quantity acquired after the certain timing. The physical quantity acquired before the certain timing may be composed of plural physical quantities acquired at plural timings before the certain timing. The physical quantity acquired after the certain timing may be composed of plural physical quantities acquired at plural timings after the certain timing.

The fluctuation pattern is a type of the fluctuation among physical quantities that are sequentially acquired at plural timings. The misfire pattern range is a combination of value ranges that are respectively set for plural physical quantities obtained at plural timings, for example. Whether or not a fluctuation pattern falls within a set misfire pattern range is determined by whether or not each of the physical quantities that are sequentially acquired falls within each of the value ranges set in the misfire pattern range. This is not limiting. For example, the misfire pattern range may be conditioned by a state where a physical quantity acquired after another physical quantity acquired at a certain timing is increased or decreased as compared to the other physical quantity.

The determination object of the second determination unit may be a crankshaft rotation speed fluctuation physical quantity that is determined as being greater than the physical quantity determination reference by the first determination unit and a physical quantity before/after the crankshaft rotation speed fluctuation physical quantity that is determined as being greater than the physical quantity determination reference by the first determination unit. This is not limiting. For example, the determination object of the second determination unit may be every physical quantity and a physical quantity before/after every physical quantity.

The third determination unit determines whether a misfire determination is to be set as effective or not, based on the frequency of crankshaft rotation speed fluctuation physical quantities that are determined as being within the misfire pattern range by the second determination unit relative to the frequency of crankshaft rotation speed fluctuation physical quantities that are determined as being greater than the physical quantity determination reference by the first determination unit. This is not limiting. For example, the third determination unit may make the determination based on the frequency of crankshaft rotation speed fluctuation physical quantities that are determined as being within the misfire pattern range by the second determination unit relative to the frequency of all the acquired crankshaft rotation speed fluctuation physical quantities.

The third determination unit determines whether a misfire determination is to be set as effective or not, based on a result of the determination by the first determination unit and a result of the determination by the second determination unit, in a case where the internal combustion engine is operating in the low load and low rotation speed region. The third determination unit may determine whether a misfire determination is to be set as effective or not, based on a result of the determination by the first determination unit and a result of the determination by the second determination unit, in a case where the internal combustion engine is operating in a region different from the low load and low rotation speed region.

The misfire determination is a determination based on the frequency of crankshaft rotation speed fluctuation physical quantities that are determined as being greater than the physical quantity determination reference by the first determination unit. In this configuration, for example, if the misfire determination is set as effective, the frequency of crankshaft rotation speed fluctuation physical quantities that are determined as being greater than the physical quantity determination reference by the first determination unit serves as a misfire frequency. The misfire determination is not limited to this, and may be a determination further based on the frequency of crankshaft rotation speed fluctuation physical quantities that are determined as being within the misfire pattern range by the second determination unit among crankshaft rotation speed fluctuation physical quantities that are determined as being greater than the physical quantity determination reference by the first determination unit. In this configuration, if the misfire determination is set as effective, for example, the frequency of crankshaft rotation speed fluctuation physical quantities that are determined as being within the misfire pattern range by the second determination unit among crankshaft rotation speed fluctuation physical quantities that are determined as being greater than the physical quantity determination reference by the first determination unit serves as a misfire frequency. In a case where the determination by the second determination unit is independent of the determination by the first determination unit, the misfire determination may be a determination based on the frequency of crankshaft rotation speed fluctuation physical quantities that are determined as being within the misfire pattern range by the second determination unit.

Advantageous Effects of Invention

The present teaching can provide a straddled vehicle engine unit including two or more cylinders and mounted to a straddled vehicle, the straddled vehicle engine unit capable of detecting a misfire in an internal combustion engine with high accuracy over a wide operation range of the internal combustion engine.

DESCRIPTION OF EMBODIMENTS

In the following, an embodiment of the present teaching will be described with reference to the drawings.

Figure 1:
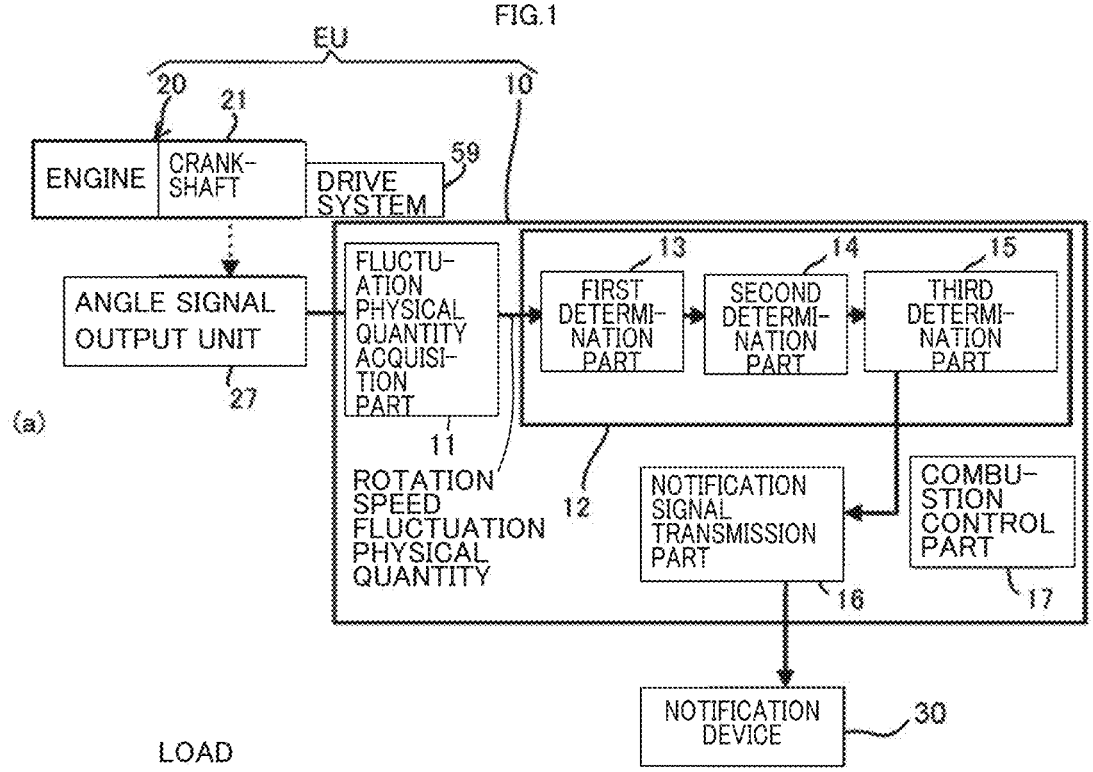
FIG. 1 A diagram outlining a straddled vehicle engine unit according to a first embodiment of the present teaching, and a diagram illustrating rotation speed fluctuation physical quantity distributions FIG. 2 A view showing an external appearance of a straddled vehicle equipped with the straddled vehicle engine unit shown in FIG. 1
Figure 1:
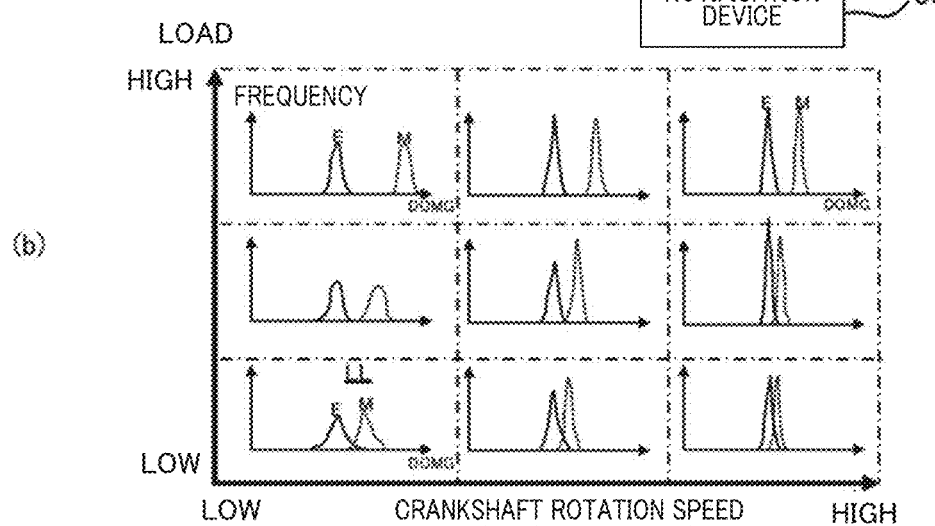
Figure 1:
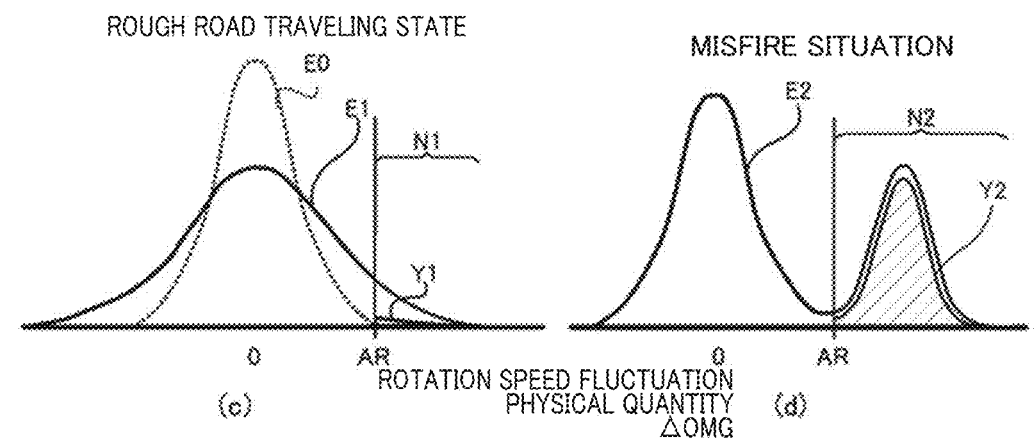

FIG. 1 is a diagram outlining a straddled vehicle engine unit according to a first embodiment of the present teaching, and a diagram illustrating rotation speed fluctuation physical quantity distributions. The part (b) of FIG. 1 shows rotation speed fluctuation physical quantity distributions related to an engine (i.e., a crankshaft rotation speed-engine load distribution graph). The part (c) of FIG. 1 shows a rotation speed fluctuation physical quantity distribution E1 in a rough road traveling state. The part (d) of FIG. 1 shows a rotation speed fluctuation physical quantity distribution E2 in a misfire situation.

A straddled vehicle engine unit EU includes an engine 20 and a misfire detection device 10. The straddled vehicle engine unit is provided in a straddled vehicle 50 (see FIG. 2). That is, the engine 20 is provided in the straddled vehicle 50.

The engine 20 is an internal combustion engine. The engine 20 has a crankshaft 21 and a crank angle signal output unit 27 (hereinafter, also referred to as the angle signal output unit 27). Power of the engine 20 is outputted via the crankshaft 21. The angle signal output unit 27 periodically outputs a crank angle signal in accordance with rotation of the crankshaft 21.

The misfire detection device 10 detects a misfire in the engine 20. The misfire detection device 10 also functions as a rough road detection device for detecting whether or not the straddled vehicle 50 is traveling on rough road. The misfire detection device 10 controls the engine 20.

The misfire detection device 10 includes a crankshaft rotation speed fluctuation physical quantity acquisition part 11 (hereinafter, also referred to as the fluctuation physical quantity acquisition part 11) and a misfire determination part 12. The misfire determination part 12 includes a first determination part 13, a second determination part 14, and a third determination part 15. The misfire detection device 10 further includes a notification signal transmission part 16 and a combustion control part 17.

The fluctuation physical quantity acquisition part 11 is an example of the crankshaft rotation speed fluctuation physical quantity acquisition unit. The misfire determination part 12 is an example of the misfire determination unit. The first determination part 13 is an example of the first determination unit. The second determination part 14 is an example of the second determination unit. The third determination part 15 is an example of the third determination unit.

The fluctuation physical quantity acquisition part 11 acquires a crankshaft rotation speed fluctuation physical quantity (hereinafter, also referred to as a rotation speed fluctuation physical quantity) in relation to the crankshaft rotation speed fluctuation physical quantity, based on a signal from the angle signal output unit 27. The rotation speed fluctuation physical quantity is a physical quantity related to the amount of fluctuation in the rotation speed of the crankshaft 21 in a specific kind of stroke out of two or more kinds of strokes of the engine 20. A normal situation and a misfire situation have different rotation speed fluctuation physical quantities. The rotation speed fluctuation physical quantity in the normal situation and the rotation speed fluctuation physical quantity in the misfire situation have different distributions.

The part (b) of FIG. 1 shows rotation speed fluctuation physical quantity distributions related to the engine. In the part (b) of FIG. 1, a rotation speed fluctuation physical quantity distribution E in the normal situation and a rotation speed fluctuation physical quantity distribution M in the misfire situation are indicated with respect to each of nine regions that are different from one another in terms of a combination of the magnitude of the crankshaft rotation speed and the magnitude of a load.

The engine 20 is configured to operate in a region including an overlap operation region. The overlap operation region of the engine 20 is a region where the rotation speed fluctuation physical quantity distribution E in the normal situation having no misfire and the rotation speed fluctuation physical quantity distribution M in the misfire situation partially overlap each other. The overlap operation region of the engine 20 includes, for example, a low load and low rotation speed region LL.

The first determination part 13 of the misfire detection device 10 determines whether or not a rotation speed fluctuation physical quantity obtained from the fluctuation physical quantity acquisition part 11 is greater than a physical quantity determination reference AR shown in the part (c) of FIG. 1. The physical quantity determination reference AR is set between a crankshaft rotation speed fluctuation physical quantity corresponding to the peak of the crankshaft rotation speed fluctuation physical quantity distribution E in the normal situation and a crankshaft rotation speed fluctuation physical quantity corresponding to the peak of the crankshaft rotation speed fluctuation physical quantity distribution M in the misfire situation.

The first determination part 13 stores the frequency of rotation speed fluctuation physical quantities N2 greater than the physical quantity determination reference AR, as a provisional misfire frequency.

The second determination part 14 determines whether or not a fluctuation pattern constituted by a rotation speed fluctuation physical quantity and rotation speed fluctuation physical quantities acquired before and after the rotation speed fluctuation physical quantity falls within a set misfire pattern range. If the first determination part 13 determines that a rotation speed fluctuation physical quantity is greater than the physical quantity determination reference, the second determination part 14 determines whether or not the rotation speed fluctuation physical quantity that has been determined as being greater than the physical quantity determination reference falls within the misfire pattern range. The second determination part 14 makes a determination on a fluctuation pattern constituted by the rotation speed fluctuation physical quantity that the first determination part 13 has determined as being greater than the physical quantity determination reference and rotation speed fluctuation physical quantities acquired before and after the rotation speed fluctuation physical quantity.

As shown in the part (c) of FIG. 1, the rotation speed fluctuation physical quantity distribution E1 in the rough road traveling state is wider than the distribution E0 in a flat road traveling state. In the rotation speed fluctuation physical quantity distribution E1 in the rough road traveling state, rotation speed fluctuation physical quantities N1, which are greater than the physical quantity determination reference AR, are erroneously determined as a possible misfire by the first determination part 13. Of the rotation speed fluctuation physical quantities N1, rotation speed fluctuation physical quantities Y1 are determined as being within the pattern range by the second determination part 14. In a case of the rough road traveling state, the frequency of the rotation speed fluctuation physical quantities Y1 is low.

As shown in the part (d) of FIG. 1, in the rotation speed fluctuation physical quantity distribution E2 in a case of a misfire, rotation speed fluctuation physical quantities N2, which are greater than the physical quantity determination reference AR, are determined as a possible misfire by the first determination part 13. The rotation speed fluctuation physical quantities N2, which are greater than the physical quantity determination reference AR, are attributable to an actual misfire. Therefore, the rotation speed fluctuation physical quantities Y2, which are determined as being within the pattern range by the second determination part 14, appear more frequently in the rotation speed fluctuation physical quantities N2.

The third determination part 15 determines whether a misfire determination is to be set as effective or not, based on a result of the determination by the first determination part 13 and a result of the determination by the second determination part 14. The third determination part 15 determines that a misfire determination is to be set as effective, based on a frequency of rotation speed fluctuation physical quantities that are determined as being within the misfire pattern range by the second determination part 14 relative to a frequency of rotation speed fluctuation physical quantities that are determined as being greater than the physical quantity determination reference AR by the first determination part 13. More specifically, the third determination part 15 determines that a misfire determination is to be set as effective, if the ratio of the frequency of rotation speed fluctuation physical quantities that are determined as being within the misfire pattern range by the second determination part 14 to the frequency of rotation speed fluctuation physical quantities that are determined as being greater by the first determination part 13 is equal to or greater than a reference value.

The notification signal transmission part 16 notifies a result of the determination made by the misfire determination part 12. If the misfire determination part 12 determines the presence of a misfire, the notification signal transmission part 16 causes a notification device 30 (see FIG. 3) to display the presence of a misfire. The notification signal transmission part 16 also causes the notification device 30 to display information on the misfire.

If the misfire determination part 12 detects traveling on rough road, the notification signal transmission part 16 outputs information to the notification device 30, the information indicating a detection result of traveling on rough road. If the misfire determination part 12 determines that the misfire determination is to be set as effective, the notification signal transmission part 16 outputs misfire information to the notification device 30, the misfire information indicating a result of the misfire detection. The notification signal transmission part 16 outputs information stored therein, when a diagnosis device serving as the notification device 30 becomes or is connected to the misfire detection device 10.

An erroneous determination may be mixed in results of determinations by the first determination part 13, as mentioned above. Therefore, when the straddled vehicle 50 is in the rough road traveling state for example, the number of rotation speed fluctuation physical quantities erroneously determined as being greater than the physical quantity determination reference though it is not in the misfire situation may increase.

The second determination part 14 performs a determination using a reference different from the reference used in the determination performed by the first determination part 13. For example, if a result of the determination by the second determination part 14 largely differs from a result of the determination by the first determination part 13, it probably indicates a situation where the first determination part 13 cannot determine a misfire. The third determination part 15 determines whether the misfire determination is to be set as effective or not, based on the result of the determination by the second determination part 14 and the result of the determination by the first determination part 13. Accordingly, a misfire in the engine 20 including two or more cylinders can be detected with high accuracy.

The fluctuation attributable to a misfire is a phenomenon unique to a combustion cycle, and therefore its mode is less diversified than a mode of the fluctuation attributable to traveling on rough road. This is why the accuracy of determining that a crankshaft rotation speed fluctuation is attributable to a misfire is higher than the accuracy of determining that a fluctuation is attributable to traveling on rough road, for example. By using a result obtained by the second determination part 14, which determines a crankshaft rotation speed fluctuation attributable to a misfire, an influence of traveling on rough road can be removed with higher accuracy.

Figure 2:
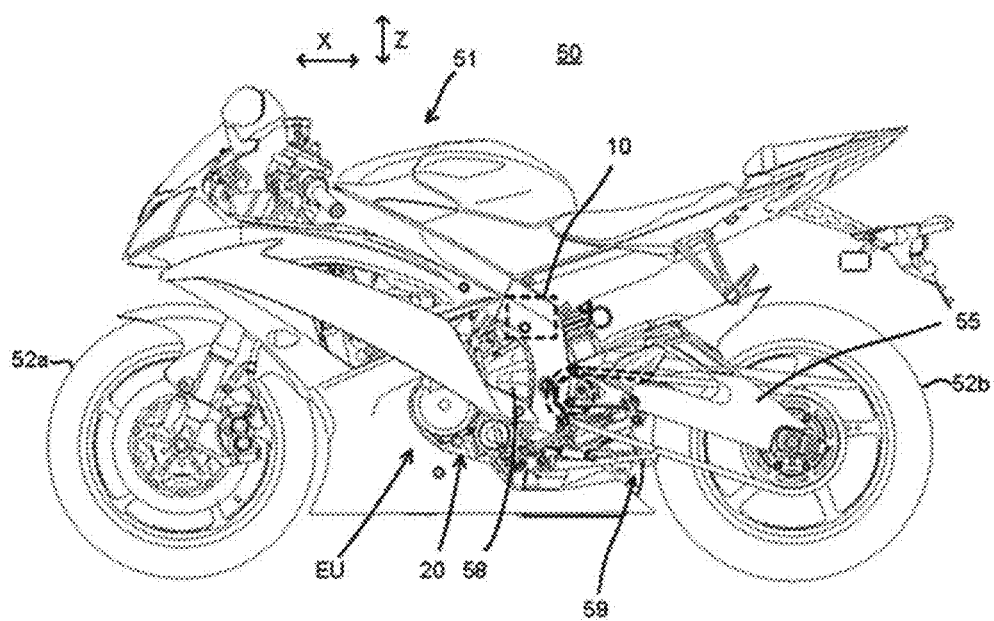

FIG. 2 is a view showing an external appearance of the straddled vehicle equipped with the straddled vehicle engine unit shown in FIG. 1.

The straddled vehicle 50 shown in FIG. 2 includes a vehicle body 51 and wheels 52a, 52b. The wheels 52a, 52b are supported by the vehicle body 51. The straddled vehicle 50 is a motorcycle with two wheels 52a, 52b. The wheels 52a, 52b provided to the vehicle body 51 of the straddled vehicle 50 are disposed one behind the other in a front-rear direction X of the straddled vehicle 50. The rear wheel 52b is a driving wheel.

The straddled vehicle 50 includes the straddled vehicle engine unit EU and a drive system 59. The straddled vehicle engine unit EU includes the misfire detection device 10 and the engine 20. The drive system 59 drives the straddled vehicle 50 by transmitting power of the engine 20.

Figure 3:
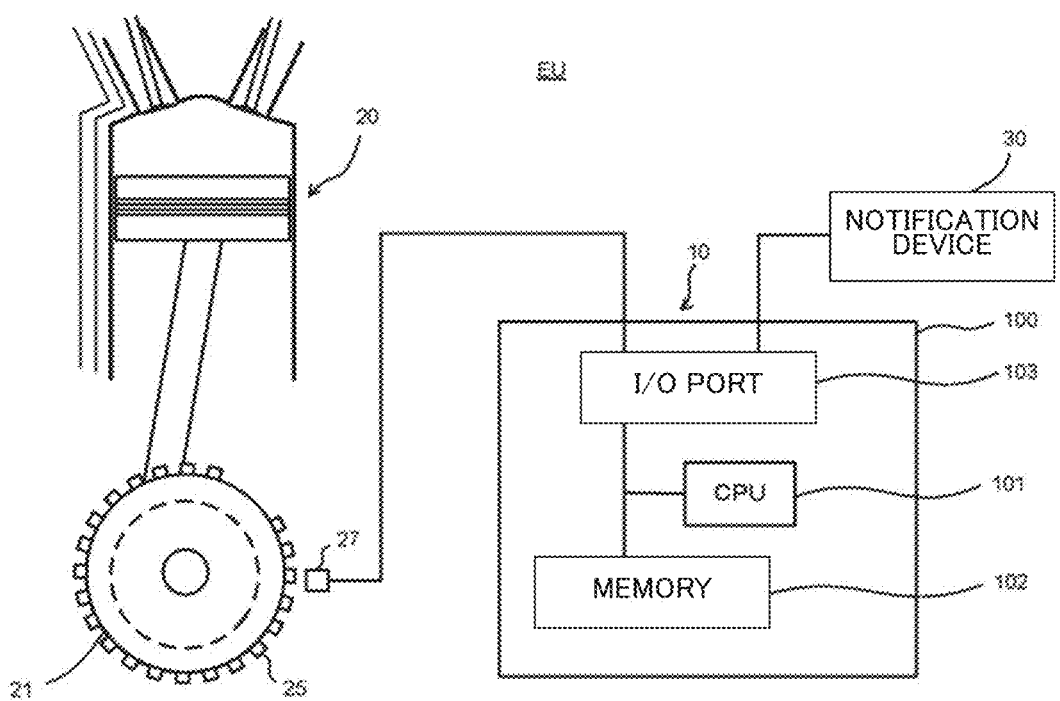
FIG. 3 A configuration diagram schematically showing configurations of a misfire detection device shown in FIG. 1 as well as peripheral devices thereof FIG. 4 A chart showing an exemplary rotation speed of a crankshaft FIG. 5 A diagram illustrating a rotation speed fluctuation physical quantity distribution FIG. 6 A diagram illustrating rotation speed fluctuation physical quantity distributions in relation to an engine FIG. 7 A chart showing an exemplary fluctuation pattern of the rotation speed fluctuation physical quantity FIG. 8 A diagram showing detailed breakdowns of rotation speed fluctuation physical quantity distributions in a rough road traveling state and in a misfire situation FIG. 9 A flowchart showing operations of the misfire detection device shown in FIG. 1

FIG. 3 is a configuration diagram schematically showing configurations of the misfire detection device shown in FIG. 1 as well as peripheral devices thereof.

The misfire detection device 10 shown in FIG. 3 is a device related to the engine 20. The engine 20 according to this embodiment is a three-cylinder engine.

The engine 20 includes the crankshaft 21. The crankshaft 21 rotates in conduction with operations of the engine 20. The crankshaft 21 has two or more detection object portions 25 for use to detect rotation of the crankshaft 21. The detection object portions 25 are arranged at intervals in the circumferential direction of the crankshaft 21, the intervals corresponding to predetermined detection angles relative to the rotational center of the crankshaft 21. For instance, each of the detection angles is 15 degrees. It however is to be noted that the interval of some adjacent detection object portions 25 is larger than the detection angle mentioned above. The detection object portions 25 move as the crankshaft 21 rotates.

Upon detecting passing of any detection object portion 25, the angle signal output unit 27 outputs a signal. Consequently, the angle signal output unit 27 periodically outputs a crank angle signal (angle signal) in accordance with rotation of the crankshaft 21. For example, when the crankshaft 21 rotates at a fixed speed, the angle signal output unit 27 outputs the angle signal on a fixed cycle according to the detection angle. It however is to be noted that at some rotation angle, the angle signal output unit 27 outputs the angle signal on a cycle longer than the cycle according to the detection angle.

A computer 100 that configures the misfire detection device 10 includes a CPU 101, a memory 102, and an I/O port 103.

The CPU 101 executes a computing process based on a control program. The memory 102 stores the control program and information necessary for computation. The I/O port 103 inputs and outputs signals to and from an external device.

Connected to the I/O port 103 is the angle signal output unit 27. The angle signal output unit 27 outputs the angle signal as the crankshaft 21 of the engine 20 rotates by every detection angle.

Also connected to the I/O port 103 is the notification device 30. The notification device 30 displays information based on a signal outputted from the misfire detection device 10. The notification device 30 is, for example, a display lamp provided to the straddled vehicle 50. The notification device 30 encompasses a diagnosis device, which is an external device of the straddled vehicle 50, for example.

The misfire detection device 10 according to this embodiment detects a misfire in the engine 20 based on the rotation speed of the crankshaft 21. The misfire detection device 10 according to this embodiment has a function as an engine control unit (ECU) that controls operations of the engine 20, too. An intake air pressure sensor, a fuel injection device, and a spark plug, all of which are not shown, are connected to the misfire detection device 10.

The fluctuation physical quantity acquisition part 11, the misfire determination part 12, the first determination part 13, the second determination part 14, the third determination part 15, the notification signal transmission part 16, and the combustion control part 17 shown in FIG. 1 are implemented by hardware shown in FIG. 3 being controlled by the CPU 101 (see FIG. 3) that executes the control program.

The fluctuation physical quantity acquisition part 11 shown in the part (a) of FIG. 1 acquires a rotation speed fluctuation physical quantity on the crankshaft 21 based on an angle signal received from the angle signal output unit 27. The angle signal is outputted as the crankshaft 21 rotates by every detection angle.

The fluctuation physical quantity acquisition part 11 acquires a rotation speed by measuring a time interval of timings at which the angle signal output unit 27 outputs a signal. The fluctuation physical quantity acquisition part 11 also acquires a rotation speed fluctuation physical quantity. The rotation speed fluctuation physical quantity acquired by the fluctuation physical quantity acquisition part 11 is a rotation speed fluctuation physical quantity on the engine 20.

A fluctuation in the rotation speed of the engine 20 includes a fluctuation attributable to combustion of the engine 20. The fluctuation attributable to combustion of the engine 20 has an angular period equal to or shorter than a crank angle that corresponds to four strokes.

The fluctuation in the rotation speed of the engine 20 may sometimes include not only the fluctuation attributable to combustion of the engine 20 but also a fluctuation attributable to traveling on rough road. Traveling on rough road is an external factor of the engine 20.

The fluctuation physical quantity acquisition part 11, for example, acquires a rotation speed in a section of 180 crank angle degrees corresponding to a combustion stroke of each cylinder and a rotation speed in a section of 180 crank angle degrees corresponding to strokes between combustion strokes.

The fluctuation physical quantity acquisition part 11 calculates the amount of fluctuation in the rotation speed of the engine 20, corresponding to cylinders that successively undergo strokes of the same kind. Based on this amount of fluctuation, the fluctuation physical quantity acquisition part 11 acquires a rotation speed fluctuation physical quantity.

Figure 4:
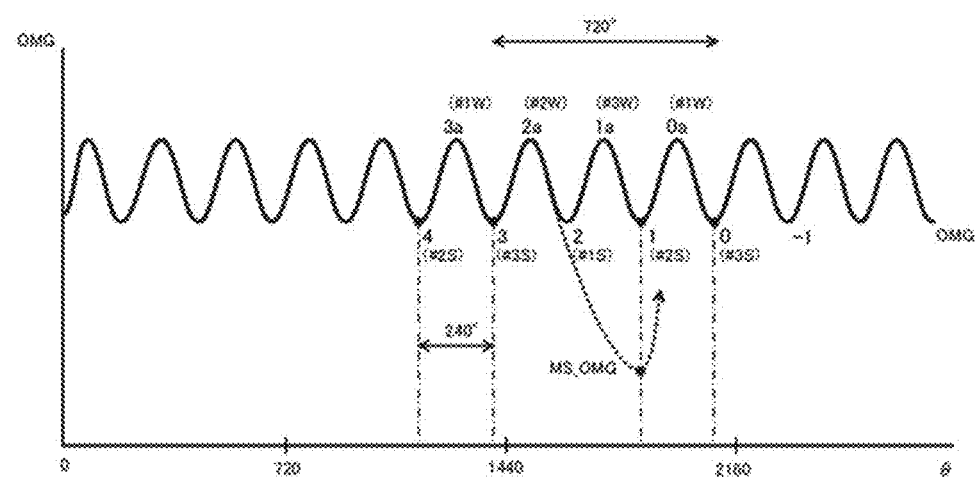

FIG. 4 is a chart showing an exemplary rotation speed of the crankshaft.

In the graph of FIG. 4, the horizontal axis represents the rotation angle θ of the crankshaft 21, and the vertical axis represents the rotation speed. In the example illustrated in FIG. 4, a fluctuation attributable to external factors of the engine 20 is not considered, for ease of understanding the relationship of the rotation speed.

The graph of FIG. 4 outlines a fluctuation in the rotation speed OMG. A graph of the rotation speed OMG is obtained by connecting with a curved line a rotation speed value calculated at a crank angle corresponding to a combustion stroke and a rotation speed value calculated at a crank angle corresponding to an intake stroke.

The graph of FIG. 4 indicates a transition of the rotation speed OMG over the crank angle, instead of a transition of the rotation speed over time.

A rotation fluctuation attributable to the combustion operation has cycle periods in each 720 crank angle degrees. The number of the cycle periods corresponds to the number of cylinders. The engine 20 of this embodiment is a three-cylinder four-stroke engine of equal interval combustion type. The rotation fluctuation in the rotation speed OMG shown in FIG. 4 has three cycle periods in each 720 crank angle degrees. That is, the rotation fluctuation attributable to the combustion operation of the engine 20 has a period shorter than the crank angle (720 degrees) corresponding to four strokes. A peak of the rotation speed corresponding to a compression stroke of each cylinder, appears every 240 crank angle degrees.

In the graph of FIG. 4, a crank angle position serving as a detection object at a certain time point is numbered "0". Starting from the position "0", every 240 crank angle degrees is numbered "1", "2", "3", . . . . Additionally, lettered numbers are given, such as "0a" between "0" and "1", and "1a" between "1" and "2". In the example illustrated in FIG. 4, the intake stroke (#3S) of a third cylinder out of the three cylinders is set as the position "0", which serves as the detection object at the certain time point. The positions "1", "2", and "3" correspond to the intake strokes (#2S, #1S, #3S) of the second, first, and third cylinders, respectively.

Values of the rotation speed OMG at the positions "0", "1", "2", . . . are expressed as OMG0, OMG1, OMG2, . . . . A rotation speed of the crankshaft 21 acquired by the fluctuation physical quantity acquisition part 11 is a rotation speed of the engine 20. Thus, descriptions will be given on the assumption that the rotation speed OMG of the crankshaft 21 is the rotation speed OMG of the engine 20.

The fluctuation physical quantity acquisition part 11 shown in the part (a) of FIG. 1 calculates a difference between rotation speeds corresponding to cylinders that successively undergo strokes of the same kind. As the rotation speeds, the fluctuation physical quantity acquisition part 11 uses rotation speeds OMG of the engine 20. The difference thus calculated serves as a first fluctuation amount.

For example, given that the position "0" in FIG. 4 serves as the detection object, the positions "0" and "1" are crank angle positions corresponding to cylinders that successively undergo strokes of the same kind. For example, the position "1" corresponds to the intake stroke (#2S in FIG. 4) of the second cylinder. The position "0" corresponds to the intake stroke (#3S in FIG. 4) of the third cylinder. That is, the intake stroke of the second cylinder and the intake stroke of the third cylinder successively occur at the positions "1" and "0". The first fluctuation amount is a difference between a rotation speed OMG1 and a rotation speed OMG0. Here, the rotation speed OMG1 is a rotation speed at the position "1" shown in FIG. 4. The rotation speed OMG0 is a rotation speed at the position "0".

The fluctuation physical quantity acquisition part 11 further calculates a difference between rotation speeds corresponding to cylinders that successively undergo strokes of the same kind at positions 720 crank angle degrees before the positions of the crankshaft 21 at which the first fluctuation amount was calculated. This difference serves as a second fluctuation amount. The positions of the crankshaft 21 preceding by 720 crank angle degrees and corresponding to the cylinders that successively undergo strokes of the same kind are the positions "3" and "4". The second fluctuation amount is a difference between a rotation speed OMG8 and a rotation speed OMG6. Here, the rotation speed OMG6 is a rotation speed OMG of the engine 20 at the position "3". The rotation speed OMG8 is a rotation speed at the position "4".

The fluctuation physical quantity acquisition part 11 also calculates a difference between the first fluctuation amount and the second fluctuation amount, as a rotation speed fluctuation physical quantity $\Delta$OMG. The fluctuation physical quantity acquisition part 11 outputs the difference thus calculated, as a rotation speed fluctuation physical quantity. The positions "0", "1", "2", . . . also serve as timings for acquisition of a rotation speed fluctuation physical quantity. Hereinafter, timings may be occasionally referred to as "0", "1", "2", . . . .

In FIG. 4, the broken line MS_OMG indicates a rotation speed fluctuation in a misfire situation. The broken line MS_OMG outlines a rotation speed fluctuation in a misfire situation, in the combustion stroke (#3W) of the third cylinder. If a misfire occurs, a rise in the rotation speed caused by combustion does not occur, so that the rotation speed keeps lowering in a period from the combustion stroke (#2W) of the cylinder before the first cylinder to the combustion stroke (#1W) of the cylinder next to the first cylinder. Thus, the rotation speed OMG0 at the position "0" is lower than that in a normal situation having no misfire. Accordingly, the first fluctuation amount at the position "0" increases as compared to that in a normal situation having no misfire. In this case, the rotation speed fluctuation physical quantity $\Delta$OMG at the position "0" is greater than that in a normal situation having no misfire.

The first fluctuation amount or the second fluctuation amount increases also when, for example, the engine rotation is accelerated or decelerated by control. The misfire determination part 12 determines the rotation speed fluctuation physical quantity $\Delta$OMG acquired by calculation of the difference between the first fluctuation amount and the second fluctuation amount. The acceleration or deceleration of the engine rotation caused by control is less influential, therefore. In addition, a change in the rotation speed fluctuation physical quantity $\Delta$OMG after elapse of a 720 crank angle degrees period is determined, so that a change in the rotation speed between strokes of the same kind is determined. At which crank angle position an object whose change is to be determined locates is less influential, therefore. Accordingly, the acceleration or deceleration caused by control is less influential to a misfire detection and a rough road detection.

The rotation speed fluctuation physical quantity $\Delta$OMG increases in a normal situation different from the misfire situation, too, such as when the straddled vehicle 50 (see FIG. 2) equipped with the engine 20 travels on rough road instead of flat road. When the straddled vehicle 50 travels on rough road, the rotation speed fluctuation physical quantity $\Delta$OMG fluctuates. If a fluctuation attributable to traveling on rough road, which is included in a fluctuation in the rotation speed fluctuation physical quantity $\Delta$OMG, increases, the determination by the first determination part 13 may not provide a precise determination of a misfire.

Figure 5:
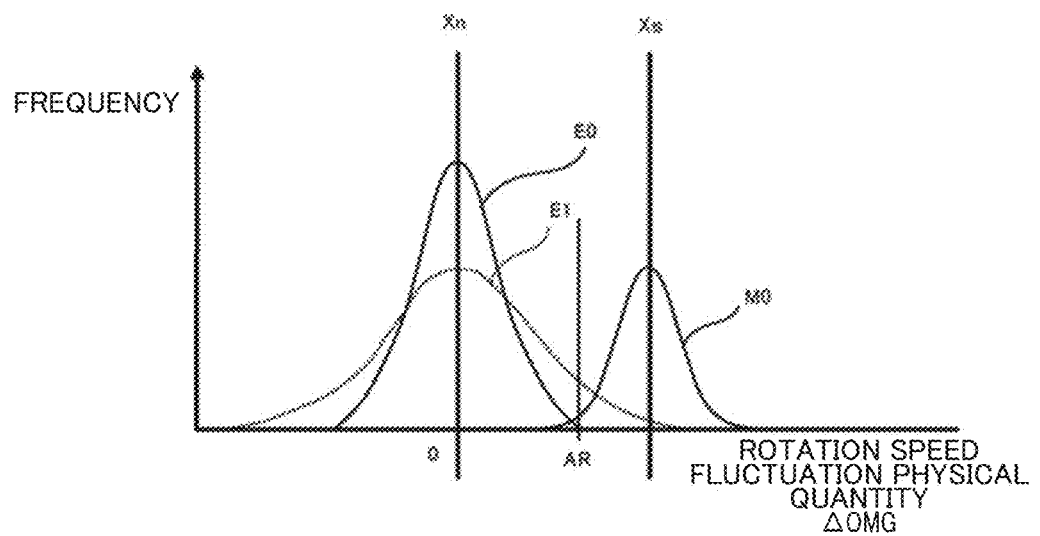

FIG. 5 is a diagram illustrating a rotation speed fluctuation physical quantity distribution.

In FIG. 5, the solid lines indicate distributions E0 and M0 of the rotation speed fluctuation physical quantity $\Delta$OMG obtained when a misfire occurs in traveling on flat road. More specifically, a rotation speed fluctuation physical quantity distribution obtained when a misfire occurs in traveling on flat road includes the distribution E0 of rotation speed fluctuation physical quantities $\Delta$OMG obtained when no misfire occurs in traveling on flat road (normal situation) and the distribution M0 obtained when a misfire occurs (misfire situation). Each of the distributions E0 and M0 is a normal distribution or substantially a normal distribution.

Referring to FIG. 5, the distribution E0 of rotation speed fluctuation physical quantities $\Delta$OMG obtained when no misfire occurs in traveling on flat road (normal situation) and the distribution M0 of the rotation speed fluctuation physical quantities $\Delta$OMG obtained when a misfire occurs (misfire situation) are at different positions. That is, in most instances, the rotation speed fluctuation physical quantities $\Delta$OMG in the normal situation and the rotation speed fluctuation physical quantities $\Delta$OMG in the misfire situation are different from each other.

The first determination part 13 according to this embodiment determines whether or not an acquired rotation speed fluctuation physical quantity is greater than the physical quantity determination reference AR. The physical quantity determination reference AR is set between a crankshaft rotation speed fluctuation physical quantity corresponding to a peak Xn of the crankshaft rotation speed fluctuation physical quantity distribution E0 in the normal situation and a crankshaft rotation speed fluctuation physical quantity corresponding to a peak Xs of the crankshaft rotation speed fluctuation physical quantity distribution M0 in the misfire situation.

The relationship between a tail of the distribution E0 of rotation speed fluctuation physical quantities ΔOMG in the normal situation and a tail of the distribution M0 of rotation speed fluctuation physical quantities ΔOMG in the misfire situation depends also on the above-described operating state of the engine 20.

Figure 6:
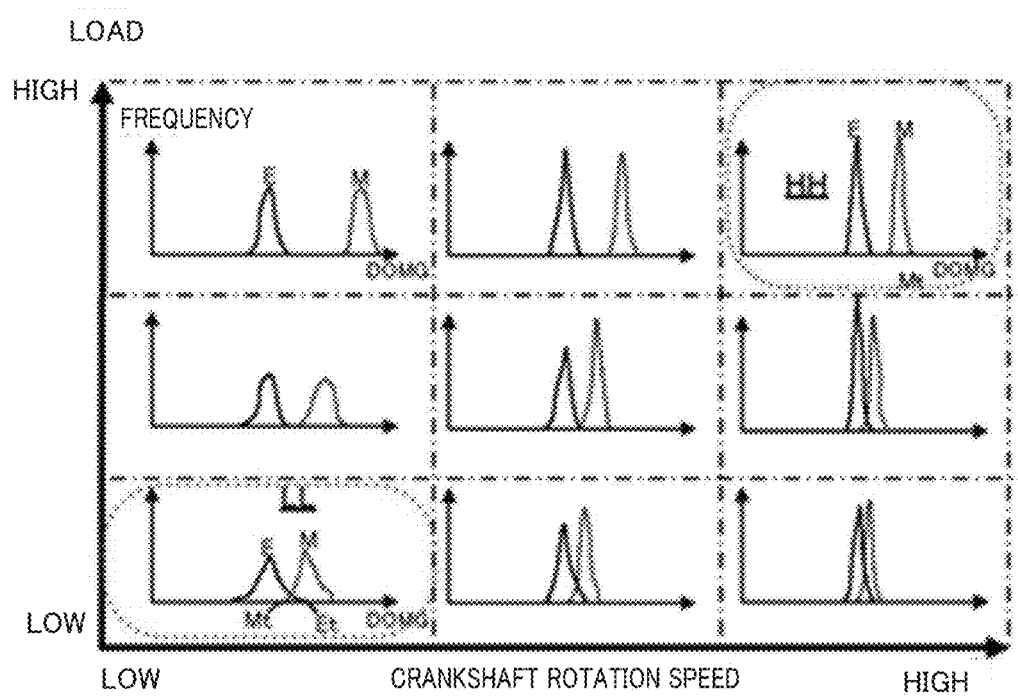

FIG. 6 is a diagram illustrating rotation speed fluctuation physical quantity distributions in relation to the engine.

In FIG. 6, the horizontal axis represents the rotation speed of the crankshaft 21. The vertical axis represents a load of the engine 20. FIG. 6 shows the entire ranges of rotation speeds and loads that can be outputted by the engine 20.

FIG. 6 indicates three regions into which the range of crankshaft rotation speeds that can be outputted by the engine 20 is equally divided. FIG. 6 also indicates three regions into which the range of loads that can be outputted by the engine 20 is equally divided. Thus, FIG. 6 indicates nine regions that are different from one another in terms of a combination of the magnitude of the crankshaft rotation speed and the magnitude of the load. Of the nine regions, a high load and high rotation speed region HH and a low load and low rotation speed region LL are given by reference signs. For example, the low load and low rotation speed region LL is a low rotation speed region including the lowest crankshaft rotation speed among the three regions into which the range of crankshaft rotation speeds that can be outputted by the engine 20 is equally divided, and at the same time is a region including the lowest load among the three regions into which the range of loads that can be outputted by the internal combustion engine is equally divided.

FIG. 6 shows a rotation speed fluctuation physical quantity distribution typical of each of the nine regions.

The engine 20 is mounted to the straddled vehicle 50, and therefore is configured such that the crankshaft 21 has a reduced moment of inertia. Because of the crankshaft 21 having the reduced moment of inertia, a distribution E and a distribution M are produced in the low load and low rotation speed region LL, the distributions E and M overlapping each other. An operation region of the engine 20 where the distribution E and the distribution M are produced so as to overlap each other will be called an overlap operation region. The low load and low rotation speed region LL is included in the overlap operation region.

In the engine 20, on the other hand, a wide interval Ga is present throughout the high load region including the high load and high rotation speed region HH.

If a sufficient interval is present between a tail Et of the distribution E and a tail Mt of the distribution M as in the high load and high rotation speed region HH for example, the tail Et of the distribution E and the tail Mt of the distribution M remain distant from each other by an interval even when the rotation speed fluctuation physical quantity ΔOMG increases due to traveling on rough road. It therefore is possible to determine a misfire based on the determination by the first determination part 13 of whether or not a rotation speed fluctuation physical quantity is greater than the physical quantity determination reference AR. It is also possible to determine whether or not it is the rough road traveling state.

In the overlap operation region including the low load and low rotation speed region LL, an interval Ga is not present between the tail Et of the distribution E and the tail Mt of the distribution M.

On the other hand, if the interval Ga is not present between the tail Et of the distribution E and the tail Mt of the distribution M as in the low load and low rotation speed region LL for example, there is a possibility that a crankshaft rotation speed fluctuation physical quantity in the normal situation may be mixed in crankshaft rotation speed fluctuation physical quantities that the first determination part 13 determines as being greater than the physical quantity determination reference AR. This lowers the misfire detection performance in the low load and low rotation speed region LL.

Furthermore, when the straddled vehicle 50 is in the rough road traveling state, the number of crankshaft rotation speed fluctuation physical quantities determined as being greater than the physical quantity determination reference AR though not in the misfire situation may increase. Thus, results of the determinations by the first determination part 13 may contain an erroneous determination.

In the misfire determination part 12 of the misfire detection device 10 shown in the part (a) of FIG. 1, the functions of the first determination part 13, the second determination part 14, and the third determination part 15 allow a misfire to be detected with high accuracy even in an overlap region including the low load and low rotation speed region LL. The misfire determination part 12 determines a misfire state in response to each acquisition of the rotation speed fluctuation physical quantity.

The first determination part 13 determines whether or not a rotation speed fluctuation physical quantity obtained from the fluctuation physical quantity acquisition part 11 is greater than the physical quantity determination reference AR.

The physical quantity determination reference AR is set between the rotation speed fluctuation physical quantity corresponding to the peak of the rotation speed fluctuation physical quantity distribution in the normal situation and the crankshaft rotation speed fluctuation physical quantity corresponding to the peak of the crankshaft rotation speed fluctuation physical quantity distribution in the misfire situation. To be specific, the physical quantity determination reference AR is set at the tail of the rotation speed fluctuation physical quantity distribution in the normal situation.

In this manner, the first determination part 13 determines a misfire by using the magnitude of the rotation speed fluctuation physical quantity.

While the engine 20 is operating in the overlap operation region including the low load and low rotation speed region LL (see FIG. 6), the first determination part 13 determines whether or not a rotation speed fluctuation physical quantity is greater than the physical quantity determination reference AR (see FIG. 5).

The second determination part 14 determines whether or not a fluctuation pattern constituted by a rotation speed fluctuation physical quantity and rotation speed fluctuation physical quantities acquired before and after the rotation speed fluctuation physical quantity falls within a set misfire pattern range.

The second determination part 14 makes a determination on a physical quantity that is a part of rotation speed fluctuation physical quantities acquired by the fluctuation physical quantity acquisition part 11. More specifically, the second determination part 14 makes a determination on a rotation speed fluctuation physical quantity that has been determined as being greater than the physical quantity determination reference AR by the first determination part 13. In other words, the second determination part 14 determines whether or not a fluctuation pattern constituted by a rotation speed fluctuation physical quantity that the first determination part 13 has determined as being greater than the physical quantity determination reference AR and rotation speed fluctuation physical quantities acquired before and after the rotation speed fluctuation physical quantity falls within the set misfire pattern range.

Figure 7:
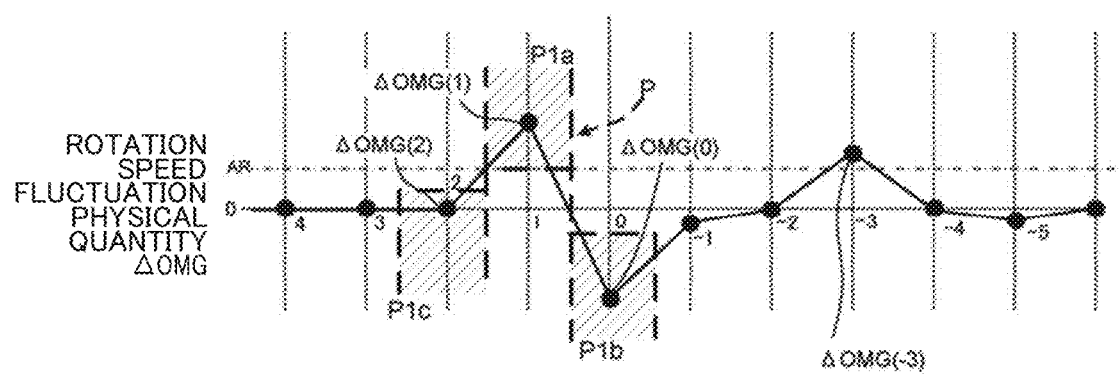

FIG. 7 is a chart showing an exemplary fluctuation pattern of the rotation speed fluctuation physical quantity.

FIG. 7 indicates a rotation speed fluctuation physical quantity ΔOMG in a case where a fluctuation attributable to a misfire and a fluctuation attributable to traveling on rough road are present.

FIG. 7 indicates a rotation speed fluctuation physical quantity in a case where an actual misfire occurs at an angle corresponding to a position immediately before the crank angle position "1". In FIG. 7, P represents an example of the misfire pattern range used by the second determination part 14.

The misfire pattern range P is a range having a peculiar pattern that appears when a misfire occurs in the engine 20. The misfire pattern range P is obtained based on, for example, measurement and calculation at the stage of designing and evaluating the engine 20.

The misfire pattern range P shown in FIG. 7 includes three reference ranges P1a, P1b, and P1c.

For example, a condition where a rotation speed fluctuation physical quantity ΔOMG at the position "1" is within the misfire pattern range P corresponds to a condition where a rotation speed fluctuation physical quantity ΔOMG1 at the position "1" is greater than the physical quantity determination reference AR, a rotation speed fluctuation physical quantity ΔOMG2 acquired at a position ("2") before the rotation speed fluctuation physical quantity ΔOMG0 is equal to or less than the upper limit value of the reference range P1c, and a rotation speed fluctuation physical quantity ΔOMG(0) acquired at a position ("0") after the rotation speed fluctuation physical quantity ΔOMG0 is equal to or less than the upper limit value of the reference range P1a. The misfire pattern range P may have a reference range to which not only the upper limit value but also the lower limit value is set. The misfire pattern range P may have two reference ranges.

In the rotation speed fluctuation physical quantity ΔOMG indicated in FIG. 7, the rotation speed fluctuation physical quantity ΔOMG(1) corresponding to the position "1" is determined as being greater than the physical quantity determination reference AR by the first determination part 13. In this case, the second determination part 14 determines whether or not a fluctuation pattern falls within the set misfire pattern range P, the fluctuation pattern being constituted by: the rotation speed fluctuation physical quantity ΔOMG(1) that the first determination part 13 has determined as being greater than the physical quantity determination reference AR; the rotation speed fluctuation physical quantity ΔOMG(2) acquired immediately before the rotation speed fluctuation physical quantity ΔOMG(1); and the rotation speed fluctuation physical quantity ΔOMG(0) acquired immediately after the rotation speed fluctuation physical quantity ΔOMG(1). In the rotation speed fluctuation physical quantity ΔOMG indicated in FIG. 7, the rotation speed fluctuation physical quantity ΔOMG(1) corresponding to the position "1" is determined as falling within the misfire pattern range P by the second determination part 14.

In this manner, the second determination part 14 performs a determination different from the determination performed by the first determination part 13.

A fluctuation in the rotation speed fluctuation physical quantity attributable to a misfire has a pattern peculiar to a misfire, unlike a fluctuation attributable to traveling on rough road for example.

In a case of the rotation speed fluctuation physical quantity ΔOMG indicated in FIG. 7, the first determination part 13 determines that a rotation speed fluctuation physical quantity ΔOMG(−3) corresponding to the position "−3" is greater than the physical quantity determination reference AR. The second determination part 14, however, determines that, for example, the rotation speed fluctuation physical quantity ΔOMG(−3) corresponding to the position "−3" does not fall within the misfire pattern range P.

By using the misfire pattern range P, the second determination part 14 is capable of a misfire determination based on a reference different from the reference used by the first determination part 13. The second determination part 14 is capable of a misfire determination with higher accuracy than the first determination part 13, for example.

Figure 8:
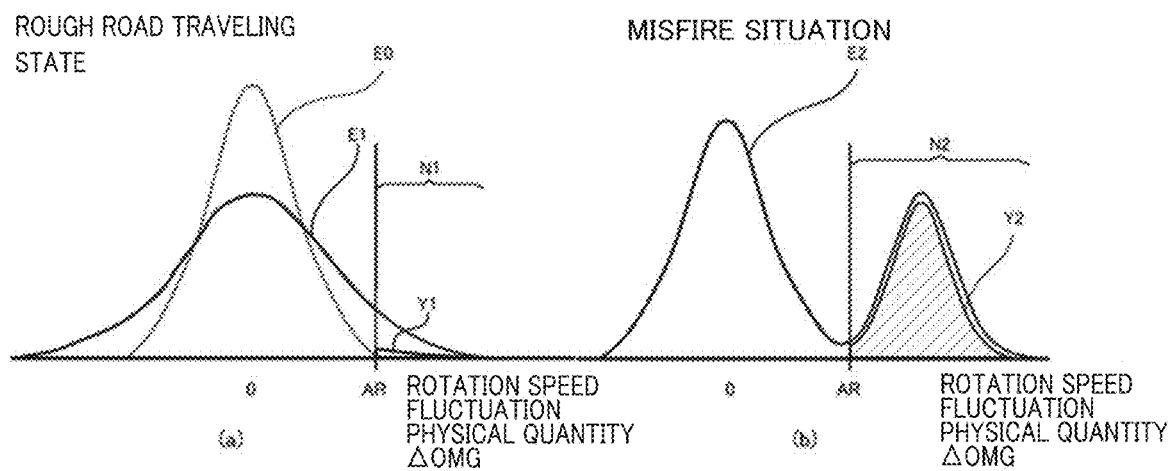

FIG. 8 is a diagram showing detailed breakdowns of the rotation speed fluctuation physical quantity distributions in the rough road traveling state and in the misfire situation. The part (a) of FIG. 8 shows a rotation speed fluctuation physical quantity distribution E1 in the rough road traveling state. The part (b) of FIG. 8 shows a rotation speed fluctuation physical quantity distribution E2 in the misfire situation. The part (a) of FIG. 8 also shows, for reference, a rotation speed fluctuation physical quantity distribution E0 in the normal situation with traveling on flat road.

In the rotation speed fluctuation physical quantity distribution E1 shown in the part (a) of FIG. 8, rotation speed fluctuation physical quantities N1, which are greater than the physical quantity determination reference AR, are erroneously determined as a possible misfire by the first determination part 13.

Of the rotation speed fluctuation physical quantities N1, rotation speed fluctuation physical quantities Y1 are determined as being within the pattern range by the second determination part 14. The frequency of the rotation speed fluctuation physical quantities Y1 is low.

In the rotation speed fluctuation physical quantity distribution E2 shown in the part (b) of FIG. 8, rotation speed fluctuation physical quantities N2, which are greater than the physical quantity determination reference AR, are determined as a possible misfire by the first determination part 13.

Of the rotation speed fluctuation physical quantities N2, rotation speed fluctuation physical quantities Y2 are determined as being within the pattern range by the second determination part 14. The frequency of the rotation speed fluctuation physical quantities Y2 is high.

Thus, the frequency of rotation speed fluctuation physical quantities that are determined as being within the pattern range by the second determination part 14 relative to the frequency of rotation speed fluctuation physical quantities that are determined as being greater than the physical quantity determination reference AR by the first determination part 13 largely varies depending on whether it is in the rough road traveling state or in the misfire situation.

The third determination part 15 determines whether a misfire determination is to be set as effective or not, based on a result of the determination by the first determination part 13 and a result of the determination by the second determination part 14.

The third determination part 15 determines whether a misfire determination is to be set as effective or not, based on the frequency of crankshaft rotation speed fluctuation physical quantities that have been determined as being within the misfire pattern range P (see FIG. 7) by the second determination part 14 relative to the frequency of crankshaft rotation speed fluctuation physical quantities that have been determined as being greater than the physical quantity determination reference AR by the first determination part 13.

While the engine 20 is operating in the low load and low rotation speed region LL (see FIG. 6), the third determination part 15 determines whether a misfire determination is to be set as effective or not, based on a result of the determination by the first determination part 13 and a result of the determination by the second determination part 14.

In the engine 20, the crankshaft rotation speed fluctuation physical quantity distribution in the normal situation and the crankshaft rotation speed fluctuation physical quantity distribution in the misfire situation overlap each other in their adjacent tails in the low load and low rotation speed region LL (see FIG. 6). In the low load and low rotation speed region LL, however, the third determination part 15 makes a determination based on a result of the determination by the second determination part 14. Accordingly, a misfire can be detected with high accuracy even in a region where overlap of adjacent tails of crankshaft rotation speed fluctuation physical quantity distributions is likely to occur.

To be specific, the third determination part 15 determines that a misfire determination is to be set as effective, if the frequency of crankshaft rotation speed fluctuation physical quantities that have been determined as being within the misfire pattern range P by the second determination part 14 is equal to or greater than a frequency reference value. The third determination part 15 counts, as the number of times a misfire occurs, the frequency of crankshaft rotation speed fluctuation physical quantities that have been determined as being greater than the physical quantity determination reference AR by the first determination part 13 and have been determined as being within the misfire pattern range P (see FIG. 7) by the second determination part 14.

If the frequency of crankshaft rotation speed fluctuation physical quantities that have been determined as being within the misfire pattern range P is less than the frequency reference value, the third determination part 15 determines that it is in the rough road traveling state. In this case, the third determination part 15 determines that the misfire determination is to be set as ineffective.

The misfire detection device 10 according to this embodiment can improve the accuracy of misfire detection by determining whether or not a fluctuation is attributable to a misfire instead of determining whether or not a fluctuation is attributable to operating conditions or traveling on rough road.

FIG. 9 is a flowchart showing operations of the misfire detection device shown in FIG. 1.

The first determination part 13 determines whether or not the engine 20 is operating in the overlap operation region (S11).

When, for example, the engine 20 is operating in the high load and high rotation speed region HH, the engine 20 is not operating in the overlap operation region. In this case (No in S11), the misfire determination part 12 performs a simplified misfire detection (S12). In the simplified misfire detection, only the value of the rotation speed fluctuation physical quantity is used to detect a misfire.

If the engine 20 is operating in the overlap operation region (Yes in S11), the first determination part 13 counts a determination period (S13). The first determination part 13 counts the determination period by counting the number of rotations of the crankshaft, for example.

Then, the first determination part 13 determines whether or not a rotation speed fluctuation physical quantity is greater than the physical quantity determination reference AR (S14). If the rotation speed fluctuation physical quantity is greater than the physical quantity determination reference AR, the rotation speed fluctuation physical quantity is abnormal, and there is a possibility of a misfire. In this case (Yes in S14), the first determination part 13 counts an abnormal fluctuation counter (S15).

Then, the second determination part 14 determines whether or not a fluctuation pattern constituted by the rotation speed fluctuation physical quantity and rotation speed fluctuation physical quantities acquired before and after the rotation speed fluctuation physical quantity falls within the set misfire pattern range (S16). More specifically, the second determination part 14 determines whether or not plural rotation speed fluctuation physical quantities that are sequentially acquired fall within the misfire pattern range P (see FIG. 7).

If the plural rotation speed fluctuation physical quantities fall within the misfire pattern range, it is determined that a misfire has occurred. In this case (Yes in S16), the second determination part 14 counts a misfire counter (S18).

If the plural rotation speed fluctuation physical quantities do not fall within the misfire pattern range, there is a possibility that the abnormality of the rotation speed fluctuation physical quantity is due to traveling on rough road. In this case (No in S16), the second determination part 14 skips counting of the misfire counter.

The third determination part 15 determines whether or not the determination period has elapsed (S19).

If the determination period has elapsed (Yes in S19), the third determination part 15 determines whether or not the ratio of the value indicated by the misfire counter to the value indicated by the abnormal fluctuation counter is more than a reference value (S22).

The ratio of the value indicated by the misfire counter to the value indicated by the abnormal fluctuation counter is more than the reference value (Yes in S22), the third determination part 15 finalizes the misfire (S23). That is, the third determination part 15 determines that the misfire determination is to be set as effective. In this case, the notification signal transmission part 16 transmits a notification signal to the notification device 30. The third determination part 15 directs the notification signal transmission part 16 to transmit the value indicated by the abnormal fluctuation counter, as the number of misfires.

If the ratio of the value indicated by the misfire counter to the value indicated by the abnormal fluctuation counter is equal to or less than the reference value (No in S22), the third determination part 15 finalizes the rough road traveling state (S24). Upon finalization of the rough road traveling state, the misfire determination part 12 stops the misfire determination. In this case, the third determination part 15 makes counting of the abnormal fluctuation counter ineffective. The third determination part 15 initializes the abnormal fluctuation counter.

In this manner, the third determination part 15 determines whether a misfire determination is to be set as effective, based on a result of the determination by the first determination part 13 and a result of the determination by the second determination part 14. Accordingly, a misfire in an internal combustion engine including two or more cylinders can be detected with high accuracy.

REFERENCE SIGNS LIST

EU straddled vehicle engine unit
10 misfire detection device
12 misfire determination part
13 first determination part (first determination unit)
14 second determination part (second determination unit)
15 third determination part (third determination unit)
20 engine (internal combustion engine)
21 crankshaft
27 crank angle signal output unit (angle signal output unit)
50 straddled vehicle
52b wheel (driving wheel)
Xn peak of crankshaft rotation speed fluctuation physical quantity distribution in normal situation
Xs peak of crankshaft rotation speed fluctuation physical quantity distribution in misfire situation
P misfire pattern range

The invention claimed is:

1. A straddled vehicle engine unit provided to a straddled vehicle, the straddled vehicle engine unit comprising:
an internal combustion engine, including
two or more cylinders,
a crankshaft, and
a crank angle signal output unit that periodically outputs a crank angle signal in accordance with rotation of the crankshaft; and
a misfire detection device, including a crankshaft rotation speed fluctuation physical quantity acquisition unit and a misfire determination unit, the crankshaft rotation speed fluctuation physical quantity acquisition unit being configured to acquire a physical quantity related to an amount of fluctuation in a rotation speed of the crankshaft as a crankshaft rotation speed fluctuation physical quantity, based on a signal from the crank angle signal output unit, the misfire determination unit being configured to determine a misfire state of the internal combustion engine based on the crankshaft rotation speed fluctuation physical quantity acquired by the crankshaft rotation speed fluctuation physical quantity acquisition unit, wherein
in a crankshaft rotation speed-engine load distribution graph of the internal combustion engine, a distribution of the crankshaft rotation speed fluctuation physical quantity in a normal situation and a distribution of the crankshaft rotation speed fluctuation physical quantity in a misfire situation partially overlap each other to form an overlap operation region,
the internal combustion engine is so configured that, while the internal combustion engine is in operation, the rotation speed of the crankshaft and a load of the internal combustion engine are located in a region including the overlap operation region in the crankshaft rotation speed-engine load distribution graph, and
the misfire determination unit includes
a first determination unit that determines whether or not each crankshaft rotation speed fluctuation physical quantity acquired by the crankshaft rotation speed fluctuation physical quantity acquisition unit is greater than a physical quantity determination reference in a case where the crankshaft rotation speed and the load of the internal combustion engine that is in operation are located in at least the overlap operation region, the physical quantity determination reference being set between two crankshaft rotation speed fluctuation physical quantities, of which one corresponds to a peak of the distribution of the crankshaft rotation speed fluctuation physical quantity in the normal situation and the other corresponds to a peak of the distribution of the crankshaft rotation speed fluctuation physical quantity in the misfire situation,
a second determination unit that determines whether or not a fluctuation pattern, constituted by one of the crankshaft rotation speed fluctuation physical quantities acquired by the crankshaft rotation speed fluctuation physical quantity acquisition unit and another of the crankshaft rotation speed fluctuation physical quantities acquired therebefore or thereafter, falls within a set misfire pattern range, and
a third determination unit that determines whether a misfire determination is set to be effective or not, based on a result of the determination by the first determination unit and a result of the determination by the second determination unit.

2. The straddled vehicle engine unit according to claim 1, wherein
said one crankshaft rotation speed fluctuation physical quantity used by the second determination unit is one of the crankshaft rotation speed fluctuation physical quantities that is determined as being greater than the physical quantity determination reference by the first determination unit.

3. The straddled vehicle engine unit according to claim 2, wherein
the third determination unit determines whether a misfire determination is set to be effective or not, based on one frequency relative to another frequency, the one frequency being a first frequency of crankshaft rotation speed fluctuation physical quantities that are determined as being within the misfire pattern range by the second determination unit, the another frequency being a second frequency of crankshaft rotation speed fluctuation physical quantities that are determined as being greater than the physical quantity determination reference by the first determination unit.

4. The straddled vehicle engine unit according to claim 1, wherein
the third determination unit determines whether a misfire determination is set to be effective or not, in a case where the internal combustion engine is operating in a low load and low rotation speed region of the crankshaft rotation speed-engine load distribution graph, the low load and low rotation speed region being the overlap operation region, and corresponding to both a low rotation speed region and a low load region, wherein
the low rotation speed region is a lowest region including a lowest crankshaft rotation speed among three regions obtained by trisecting a range of crankshaft rotation speeds that are outputted by the internal combustion engine, and
the low load region is a lowest region including a lowest load among another three regions obtained by trisecting a range of loads that are outputted by the internal combustion engine.

5. The straddled vehicle engine unit according to claim 1, wherein
the internal combustion engine is configured to operate in another region including a separate operation region in the crankshaft rotation speed-engine load distribution graph, the distribution of the crankshaft rotation speed fluctuation physical quantity in the normal situation and the distribution of the crankshaft rotation speed fluctuation physical quantity in the misfire situation being separated from each other by an interval in the separate operation region, and the physical quantity determination reference is set within a range of the interval.

6. A straddled vehicle comprising:

the straddled vehicle engine unit according to claim 1; and a driving wheel that is driven by the straddled vehicle engine unit.

\* \* \* \* \*